Patented Apr. 27, 1937

2,078,881

UNITED STATES PATENT OFFICE 2,078,881

PROCESS FOR COATING RUBBER AND PRODUCT

Walter M. Münzinger, Heidelberg-Rohrbach, Germany, assignor to Röhm & Haas Company, Philadelphia, Pa.

No Drawing. Application March 22, 1934, Serial No. 716,903. In Germany March 20, 1933

9 Claims. (Cl. 91—68)

This invention relates to a method for applying a coating to rubber surfaces for protective or decorative purposes.

Quick drying lacquers have not been satisfactory because after drying they usually do not adhere well to the rubber surface. Slow drying oil coatings have been used, but are uneconomical because of the long time required for the coating to dry thoroughly. Many methods have been suggested, but up to the present these have not proved satisfactory.

It has now been found that if the rubber surface is first coated with a layer of material which has the property of adhering firmly to the rubber on the one side and to a lacquer coating on the other, a perfectly satisfactory result is obtained. Solutions of rubber and polymers of unsaturated organic compounds have been suggested for this purpose, but the desired result was not achieved.

However, if the ground coat is made in a special way, it will adhere firmly to the rubber and also to any lacquer which may subsequently be applied. An aqueous emulsion containing rubber and one or more polymerized unsaturated organic compounds has been found very satisfactory. The rubber emulsion is preferably the natural latex, and the polymerized material is preferably made by suspending the monomeric material in water and subjecting it to polymerizing influences. The polymerizable materials which are best suited for this purpose are the esters, nitriles, amides, chlorides and anhydrides of acrylic and alpha methacrylic acid, and also vinyl acetate. Such materials yield polymers which are more or less extensible like rubber and which have the property, especially when emulsified in water and mixed with latex, of adhering firmly to rubber surfaces.

For certain effects, coloring matter, pigments, fillers and plasticizers may be added to the emulsion.

The polymeric materials may be made from only one polymerizable compound, or two or more such compounds can be polymerized jointly. Furthermore, mixtures of the finished polymers may also be used.

The coating may be applied in any way such as by dipping, brushing, or spraying, and the finishing lacquer may be applied in a similar manner.

Any rubber surface, whether vulcanized or not, can be coated in this way and finished by applying a coat of a lacquer to the object.

The following examples will illustrate the invention, but this is not limited by the actual materials or proportions set forth since other polymerizable materials may be used, and the rubber may also be in the form of an artificial or vulcanized latex.

*Example 1.*—A rubber surface is first coated with an emulsion made up of equal volumes of concentrated latex (75% dry rubber) and an aqueous dispersion containing 25% of polymerized ethyl methacrylate. This coating is allowed to dry for about five minutes at about 25° C. and a finishing coat consisting of a 25% aqueous emulsion of polymerized methyl acrylate is applied. An extremely lustrous finish is obtained and the coatings adhere very firmly to the rubber surface.

Plasticizers such as the esters of phthalic acid, etc. may be added to the emulsion for the ground coat, and also to the finishing coat.

*Example 2.*—A rubberized fabric is coated with an aqueous emulsion of latex and a polymerized ester of methacrylic acid containing a plasticizer and after drying is coated with a suitable lacquer.

*Example 3.*—A rubber ball or glove is dipped in an aqueous emulsion of latex and a polymerized ester of acrylic acid containing a plasticizer and after drying is coated with a suitable lacquer.

*Example 4.*—A rubberized fabric is sprayed with a benzol solution of a polymerized ester of methacrylic acid and after drying is coated with a suitable lacquer.

*Example 5.*—A rubber article is dipped in an aqueous suspension of polymerized vinyl acetate and after drying a suitable lacquer is applied.

In place of the ethyl methacrylate and methyl acrylate and other compounds mentioned in the above examples, other esters of these acids such as the propyl, butyl, amyl, phenyl, benzyl, etc., may be used and the corresponding acid amides, nitriles, chlorides, or anhydrides, and vinyl acetate may be applied.

The proportions of latex and polymeric material may be varied within a wide range in order to obtain the most satisfactory finish on any particular rubber surface.

This process of coating rubber surfaces is applicable in the manufacture of shoes, gloves, balls, artificial leather, rubberized fabrics of all sorts, galoshes, etc.

Any suitable lacquer may be used for the finishing coat, but it has been found that aqueous emulsions or solutions inorganic solvents of the polymerized esters, amides, nitriles, chlorides, etc., of acrylic and methacrylic acid give excellent coatings having a permanent high gloss.

Although ordinarily dispersions and emulsions give the most satisfactory results, solutions can be employed in some cases. The solvent can ordinarily be any of the well known organic solvents, such as ethylene dichloride, etc.

Instead of coating the rubber as above described, a preformed film can be applied to the rubber surface if desired.

What I claim is:—

1. In the process of producing protective or decorative coatings on rubber articles the step which comprises applying to the rubber article a ground coat comprising an aqueous dispersion of the polymerization product of a vinyl compound which is one of the group consisting of vinyl acetate, the nitriles, chlorides, amides, anhydrides and esters of acrylic and α methacrylic acids and mixtures thereof to which natural rubber latex has been added, drying and subsequently applying a finishing lacquer coat.

2. In the process of producing protective or decorative coatings on extensible rubber articles the step which comprises applying to the rubber article a ground coat comprising an aqueous dispersion of a joint polymer of at least two vinyl compounds which are members of the group consisting of vinyl acetate, the nitriles, chlorides, amides, anhydrides and esters of acrylic and α methacrylic acids to which natural rubber latex has been added, drying and subsequently applying a finishing lacquer coat.

3. In the process of coating extensible rubber articles the step which comprises applying to the rubber article a ground coat comprising rubber and the polymerization product of ethyl acrylate.

4. In the process of coating extensible rubber articles the step which comprises applying to the rubber article a ground coat comprising rubber and the polymerization product of ethyl acrylate and subsequently applying a finishing coat comprising an aqueous dispersion of methyl acrylate.

5. In the process of coating extensible rubber articles the step comprising applying to the rubber article a ground coat comprising an aqueous dispersion of polymerized ethyl α methacrylate to which natural rubber latex has been added.

6. In the process of coating extensible rubber articles the step comprising applying to the rubber article a ground coat comprising an aqueous dispersion of polymerized ethyl α methacrylate to which natural rubber latex has been added, drying and applying a finishing coat comprising an aqueous dispersion of methyl acrylate.

7. A rubber article carrying a coating composition comprising rubber and the polymerization product of ethyl acrylate.

8. A rubber article carrying a coating composition comprising rubber and the polymerization product of ethyl α methacrylate.

9. A rubber article carrying a ground coat comprising rubber and the polymerization product of ethyl α methacrylate and a finishing coat comprising ethyl acrylate.

WALTER M. MÜNZINGER.